(12) United States Patent
Patrissi et al.

(10) Patent No.: US 7,354,626 B1
(45) Date of Patent: Apr. 8, 2008

(54) METHOD FOR INCREASING FIBER DENSITY IN ELECTROSTATIC FLOCKING

(75) Inventors: Charles J. Patrissi, Newport, RI (US); Russell R. Bessette, Mattapoisett, MA (US); Louis G. Carreiro, Westport, MA (US); Yong K. Kim, Dartmouth, MA (US); Thomas M. Arruda, Quincy, MA (US); Craig M. Deschenes, Somerset, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/586,277

(22) Filed: Oct. 26, 2006

(51) Int. Cl.
*B05D 1/14* (2006.01)

(52) U.S. Cl. ...................... 427/462; 427/475

(58) Field of Classification Search ............... 427/462, 427/475
See application file for complete search history.

(56) References Cited

U.S. PATENT DOCUMENTS

| | | | | |
|---|---|---|---|---|
| 2,345,376 A | * | 3/1944 | Bodle et al. ................. | 427/206 |
| 2,484,787 A | * | 10/1949 | Grant .......................... | 429/144 |
| 3,798,048 A | * | 3/1974 | Brody et al. ................ | 427/462 |
| 4,879,969 A | | 11/1989 | Haranoya et al. | |
| 5,108,777 A | | 4/1992 | Laird | |
| 6,554,945 B1 | | 4/2003 | Abe | |
| 6,736,899 B1 | | 5/2004 | Abe et al. | |
| 6,749,902 B2 | * | 6/2004 | Yonker et al. .............. | 427/458 |
| 7,052,741 B2 | * | 5/2006 | Medeiros et al. ........... | 427/464 |

* cited by examiner

*Primary Examiner*—Fred J. Parker
(74) *Attorney, Agent, or Firm*—James M. Kasischke; Jean-Paul A. Nasser; Michael P. Stanley

(57) ABSTRACT

A direct charging electrostatic flocking method is provided for the fabrication of a fibrous structure. Fibers are deposited directly on a first electrically conductive surface while a second electrically conductive surface with an adhesive thereon is disposed over the first surface. A vacuum is created in the space between the first electrically conductive surface and the second electrically conductive surface. The vacuum is then filled with sulfur hexafluoride gas. An electric field is generated between the first and second electrically conductive surfaces. The fibers leave the first electrically conductive surface, accelerate through the electric field and sulfur hexafluoride gas, and are coupled on one end thereof to the adhesive. As a result of using sulfur hexafluoride rather than air there is an increase in fiber density of the fibrous structure.

20 Claims, 1 Drawing Sheet

METHOD FOR INCREASING FIBER DENSITY IN ELECTROSTATIC FLOCKING

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

This patent application is co-pending with a related patent application entitled DIRECT CHARGING ELECTROSTATIC FLOCKING METHOD OF FABRICATING A FIBROUS STRUCTURE FOR USE IN ELECTROCHEMICAL APPLICATIONS (Navy Case No. 84699) U.S. patent application Ser. No. 10/847,684 by Yong K. Kim, Russell R. Bessette, Michelle M. Dunnell, and Charles J. Patrissi of whom Russell R. Bessette, Charles J. Patrissi and Yong K. Kim are common inventors as to this application.

BACKGROUND OF THE INVENTION (1) Field of the Invention

The present invention relates generally to methods of fabricating fibrous structures, and more particularly to a direct charging electrostatic flocking method for fabricating a fibrous structure that can be used in a variety of electrochemical applications including utilization as an electrode or as a catalyst support.

(2) Description of the Prior Art

Unmanned underwater vehicles require an energy source that has a high energy density. Furthermore, it is preferred that the energy source be reusable, efficient, cost effective, environmentally and operationally safe, have a long shelf life and not be prone to spontaneous chemical or electrochemical discharge.

In order to meet the need for a higher energy density material for use as an energy source for underwater applications, researchers are developing separated flow semi-fuel cells having an anode and a replenishable cathode. For underwater applications, semi-fuel cells are being developed that exhibit efficient usage of an electroactive species such as hydrogen peroxide for the replenishable cathode. The high operational demands of these semi-fuel cells require concentration polarization at the cathode surface to be reduced while increasing hydrogen peroxide utilization. One way of accomplishing this is to provide a cathode that has a fibrous surface (i.e., like the bristles of a brush) resulting in a higher surface area cathode. The greater the fiber density of a fibrous cathode the higher the surface area cathode thereby increasing hydrogen peroxide utilization. These fibrous cathodes are prepared using direct charging electrostatic flocking. What is needed is a method of direct charging electrostatic flocking that maximizes fiber density.

SUMMARY OF THE INVENTION

Accordingly, it is an object of the present invention to provide a method of fabricating a fibrous structure that maximizes fiber density over prior art methods.

Another object of the present invention is to provide a method of fabricating a fibrous structure that is electrically conductive for use in electrochemical applications.

Still another object of the present invention is to provide a method of fabricating a fibrous structure with vertically oriented micro-fibers, having uniform fiber density distribution and normal spatial orientation.

Still another object of the present invention is to provide a method of fabricating a fibrous structure that is capable of consistently reproducing the same structure.

Other objects and advantages of the present invention will become more obvious hereinafter in the specification and drawings.

In accordance with the present invention, a method is provided for the fabrication of a fibrous structure. A plurality of conductive fibers is deposited directly on a first electrically conductive surface. A second electrically conductive surface with an adhesive thereon is disposed over the first electrically conductive surface such that the adhesive opposes the fibers. A vacuum is created in the space between the two conductive surfaces. The space between the two conductive surfaces is then filled with sulfur hexafluoride gas. A high intensity electric field is generated between the first and second electrically conductive surfaces by providing a negative or positive voltage difference between the surfaces. As a result, at least a portion of the conductive fibers leave the first electrically conductive surface, accelerate through the electric field while oriented along field lines of the electric field and are embedded into the adhesive.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
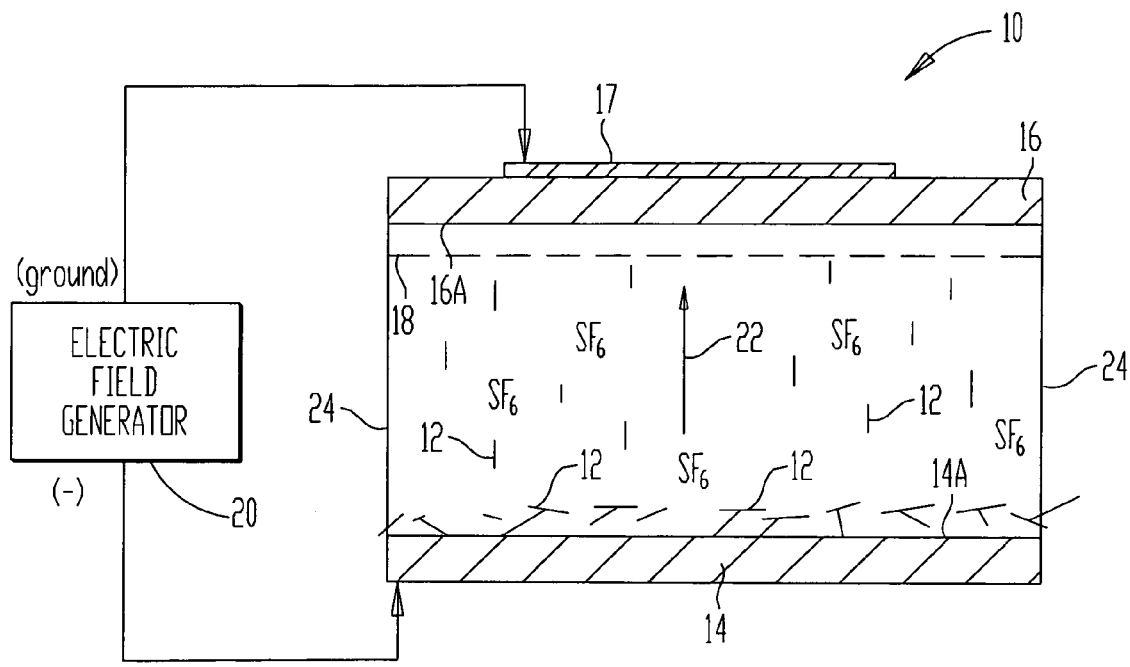
FIG. 1 is a schematic view of the apparatus used to fabricate a fibrous structure in accordance with the present invention.

Referring now to the drawings, and more particularly to FIG. 1, the apparatus used to fabricate a fibrous structure in accordance with the present invention is shown and referenced generally by numeral 10. Fabrication apparatus 10 can be used to make fibrous structures for a variety of applications to include electrodes or catalyst supports for fuel cells, semi-fuel cells, batteries, capacitors, electrochemical reactors, photovoltaic cells, sensors or any other electrochemical cells requiring a large surface area such as that presented by a flocked fibrous structure. The particular application will dictate the nature of the materials used for fabrication apparatus 10, and the ultimate fibrous structure that is made. Accordingly, it is to be understood that the present method is not limited to the particular examples that will be described herein.

In general, fabrication apparatus 10 is used to implement a direct charging electrostatic flocking process that arranges and applies material fibers onto a current collector. Specifically, the process orients the fibers in a substantially normal direction relative to the current collector surface. Initially, a measured quantity of fibers 12 is spread loosely on a substrate 14 having an electrically conductive surface 14A.

As used herein, the term "electrically conductive" refers to materials that are either highly conductive (e.g., metals) or semi-conductive (e.g., semi-conducting materials and composites). Depending on the end use of the fibrous structure being fabricated, fibers 12 can be electrically conductive or non-conductive. For example, the fibers could be made from carbon when the fabricated structure is to be used as a catalyzed cathode in a semi-fuel cell as will be explained further below. Various forms of carbon could also be used when the fibrous structure is used for lithium insertion research. Fibers 12 could also be made from a metal oxide if the fibrous structure is to be used in a lithium-ion battery or in photovoltaic devices. Still further, fibers 12 could be made from various metals when the fibrous structure is to be used in organic electrochemistry or sensor applications. Regardless of the type of fiber, fibers 12 are deposited loosely and in a homogeneous fashion on electrically conductive surface 14A.

Another electrically conductive surface 16A is placed in opposition to electrically conductive surface 14A. That is, the surface 16A of substrate 16 is placed above substrate 14. Substrate 16 is attached to upper electrode 17 that is connected to earth or machine ground. In an alternative embodiment, substrate 16 can serve as the upper electrode and be connected to earth or machine ground without need of a separate electrode. Disposed on surface 16A is a layer of adhesive as represented by dashed line 18. As with surface 14A as described above electrically conductive surface 16A can also be made from a variety of materials (e.g., metals, graphite foil, conductive metal oxides such as indium-tin oxide, high density carbon, etc.) to suit a particular application. Accordingly, it is to be understood that the choice of materials for electrically conductive surfaces 16A and 14A are not limitations of the present invention.

Adhesive layer 18 can be any wet or dry adhesive applied or deposited on surface 16A that will hold fibers 12 in place as will be explained further below. Wet adhesives include screen printing inks that are commercially available in electrically conductive formulations and are used in the preferred embodiment. Adhesive layer 18 can be electrically conductive or non-conductive depending on the fibrous structure application and/or the ability of fibers 12 to make direct contact with electrically conductive surface 16A during the flocking process.

In the preferred embodiment, uniform thickness of adhesive layer 18 is achieved via a technique called screen printing, for example, utilizing a 78 μm thick nylon screen with a mesh opening of 100 μm and 47% open area. The adhesive 18 is applied to layer 16A with a spatula then the mesh is placed on the wet adhesive 18. A squeegee is used to remove excess adhesive by drawing it over the mesh. This controls the uniformity of the thickness of adhesive layer 18.

The next step in the process is to remove all of the air in the space between the electrically conductive surface 14A and the electrically conductive surface 16A so that only a vacuum remains. In a preferred embodiment the two conductive surfaces 14A and 16A are housed in a hermetically sealed vacuum flocking chamber 24 that contains the space between them. Such a vacuum flocking chamber 24 can be made of clear plastic (e.g. acrylic or Plexiglas) that is fastened such that it is airtight. The clear plastic and the glued joints should be strong enough to support a vacuum of twenty nine inches of water. The material used to construct the vacuum flocking chamber 24 is preferably clear so that the flocking process can be visualized to check for arcing between the electrodes during flocking and also to determine when the process is complete (i.e. no fibers remain on the lower plate 14). Through fittings should also be airtight, e.g. for electrical connections from the power supply, vacuum line, and $SF_6$ flow stream. The top of the vacuum flocking chamber 24 should open to allow access to electrode 14 and quick replacement of the electrode to be flocked, 16. A seal around the top of the vacuum flocking chamber 24 can help prevent air leakage during the vacuum phase and also while the vacuum flocking chamber 24 is pressurized with $SF_6$. The top of the vacuum flocking chamber 24 can be secured by a latch that provides compression both during air evacuation and during back filling with $SF_6$.

Once all of the air in the space between the electrically conductive surface 14A and the electrically conductive surface 16A has been removed so that only a vacuum remains, the space is then filled with filtered sulfur hexafluoride ($SF_6$) gas. The $SF_6$ gas is filtered to remove hydrogen fluoride, HF, which is considered an impurity for the purposes of this invention. It is important to remove this compound from the $SF_6$ flow while or prior to filling the vacuum flocking chamber 24. HF is both toxic and corrosive. It poses a danger to humans and could adversely affect the flocking results by reaction with the specimen or other components of the flocking chamber 24 or by decreasing the dielectric strength of the $SF_6$. In the preferred embodiment, HF is removed from $SF_6$ by passing the $SF_6$ through a drying tube containing Calcium Sulfate ($CaSO_4$) and Sodium Hydroxide (NaOH). The $SF_6$ is first passed over the $CaSO_4$, which removes water and some HF. The $SF_6$ is then passed over NaOH, which is a much stronger sorbent for HF.

In an alternate embodiment it is envisioned that the steps of removing all of the air in vacuum flocking chamber 24 and then filling it with $SF_6$ gas could be replaced by a process of purging the vacuum flocking chamber 24 with $SF_6$. This would eliminate the preliminary step of creating a vacuum. There are references known in the art such as D. F. Shriver and M. A. Drezdon, "The Manipulation of Air-Sensitive Compounds", $2^{nd}$ Edition, 1980, John Wiley & Sons, Inc., New York, that describe a method of purging and an appropriate amount used to remove 99.9% of the air from an enclosed container such as the flocking chamber 24. Briefly, $SF_6$, because it is denser than air, can be added through a port at the bottom of the vacuum flocking chamber 24 while an opening at the top of the chamber would allow for air to be exhausted. Seven volumes of $SF_6$ should be used to obtain an $SF_6$/air ratio of 99.9/0.1. One consequence of the purging method would be the requirement of more $CaSO_4$ to ensure scavenging of HF from the $SF_6$ flow stream. Pressure on the flocking chamber 24 should also be monitored during purging for safety reasons. Finally, the exhaust flow stream should be vented to the outside so the operator does not inhale $SF_6$.

Using sulfur hexafluoride gas rather than air as the flocking medium increases the dielectric strength between the plates. Increasing the pressure of the sulfur hexafluoride gas has the same effect. In a preferred embodiment the space is filled to one atmosphere of pressure. In an alternate embodiment a gas pressure greater than one atmosphere may be used.

An electric field generator 20 is electrically coupled to each of electrically conductive surfaces. Conductive surface 14A is coupled through substrate 14, which serves as the lower electrode and conductive surface 16A is coupled through the upper electrode 17. In general, electric field generator 20 applies a potential difference to surfaces 14A and 16A such that an electric field is generated between surfaces 14A and 16A. Applying a high voltage to surface 14A and electrically coupling the other surface 16A, the substrate to be flocked, to ground potential can achieve such electric field generation. It is necessary that surface 14A be made from a highly conductive (e.g., metal) material. It is also preferable that a means of establishing maximum current flow voltage cutoff be incorporated.

In operation, with fibers 12 loosely deposited on electrically conductive surface 14A, with adhesive layer 18 applied to electrically conductive surface 16A that is suspended or disposed over fibers 12 and with the vacuum flocking chamber 24 having been evacuated and backfilled with sulfur hexafluoride, the electric field generator 20 is turned on. The resulting electric field between surfaces 14A and 16A causes loose fibers 12 to acquire an induced dipole and to align themselves end-to-end along electric field lines of the field and travel towards surface 16A as indicated by arrow 22. Fibers 12 accelerate through the electric field until one end thereof embeds in adhesive layer 18. The electric field can be continuously applied until some portion or all of fibers 12 leave surface 14A and are embedded in adhesive layer 18. A curing step may be required if adhesive layer 18 utilizes a wet adhesive such as a screen printing ink. At the conclusion of the flocking process (which may include the curing of adhesive layer 18), the difference in weight of the combined substrate 16, surface 16A and adhesive layer 18 with fibers 12 embedded therein can be can be determined. Also the geometric area of the flocked area should be measured after flocking has been completed to obtain data necessary for fiber density calculation.

Figure 2:
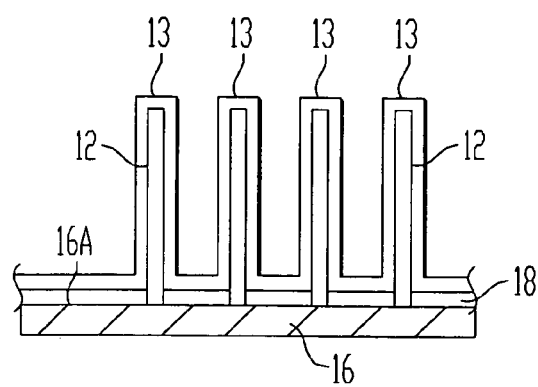
FIG. 2 is a magnified side view of a portion of the fibrous structure in which each fiber serves as a support structure for another material deposited thereon.

As described above, the end use of the fibrous structure can dictate the materials used during the process. For applications requiring electrical conductivity throughout the fibrous structure, each of substrate 16, adhesive layer 18 and fibers 12 can comprise an electrically conductive material. In other applications, it may be desirable to use fibers 12 as a support platform for another material 13 as illustrated in FIG. 2. Material 13 could be electrically conductive or non-conductive material. For example, fibers 12 could be non-conductive supports while deposited material 13 could be an electrically conductive material that is coupled to electrically conductive surface 16A via an electrically conductive adhesive layer 18. Still further, material 13 could be a catalyst material required for a chemical reaction. For example, in terms of making an electrode for a magnesium-hydrogen peroxide semi-fuel cell suitable for underwater applications, material 13 can be an electrochemical catalyst material used to facilitate the reduction of hydrogen peroxide at the semi-fuel cell's cathode. In such an application, material 13 can be an alloy of palladium and iridium. Processes for the deposition of such an alloy (as material 13) on fibers 12 is described in U.S. Pat. No. 5,296,429 and in "Electrode Surface Modification for Cathode Catalysis in Semi-Fuel Cells," J. M. Cichon et al., Proceedings of the Electrochemical Society, Vol. 98-15, p. 32-321, 1998, the contents of which are hereby incorporated by reference.

The advantages of the present invention are numerous. The simple and efficient fibrous structure fabrication process presented herein can be used in a wide variety of electrochemical applications. Fiber density is easily controlled and is, therefore, reproducible. Furthermore, tests of the present invention have produced fibrous structures with a substantially uniform fiber density. At equivalent field strengths (5 kV/cm) and gas pressures, the fiber density of flocked surfaces using sulfur hexafluoride as the flocking medium is significantly higher than that of air, thereby vastly improving the resultant fibrous structure. Higher field strength can be employed with sulfur hexafluoride as the flocking medium. The higher field strength results in higher fiber density; 443,000 fibers/$cm^2$ at 7.5 kV/cm compared to 261,000 fibers/$cm^2$ at 5.0 kV/cm at the same gas pressure. For many gases, dielectric strength increases with increasing pressure. For example, the dielectric strengths of sulfur hexafluoride and air at seven atmospheres are 400 kV/cm and 480 kV/cm respectively. Using gases at high pressure to fill the vacuum flocking chamber 24 would permit higher fiber density than at atmospheric pressure.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of fabricating a fibrous structure, comprising the steps of:

measuring and depositing a plurality of fibers directly on a first electrically conductive surface;

depositing an adhesive on a second electrically conductive surface;

disposing said second electrically conductive surface over said first electrically conductive surface such that said adhesive opposes said plurality of fibers and is spaced apart there from;

enclosing said space between said first electrically conductive surface and said second electrically conductive surface with a chamber;

permeating said chamber exclusively with sulfur hexafluoride gas, wherein said sulfur hexafluoride gas is filtered to remove hydrogen fluoride prior to permeating said chamber; and generating an electric field between said first electrically conductive surface and said second electrically conductive surface, wherein at least a portion of said plurality of fibers are propelled through said electric field from said first electrically conductive surface to said second electrically conductive surface and are coupled on one end thereof to said adhesive.

2. A method according to claim 1 wherein said chamber is hermetically sealed and said step of permeating said chamber exclusively with sulfur hexafluoride gas further comprises the steps of:

creating a vacuum in the space between the first electrically conductive surface and the second electrically conductive surface; and filling said vacuum with sulfur hexafluoride gas.

3. A method according to claim 1 wherein said step of permeating said chamber exclusively with sulfur hexafluoride gas further comprises the steps of purging said chamber with sulfur hexafluoride gas.

4. A method according to claim 1 wherein said adhesive is electrically conductive and each of said plurality of fibers is electrically conductive.

5. A method according to claim 1 further comprising the step of depositing a material on said portion of said plurality of fibers that are coupled to said adhesive.

6. A method according to claim 1 further comprising the step of depositing a catalyst material on said portion of said plurality of fibers that are coupled to said adhesive.

7. A method according to claim 1 wherein each of said plurality of fibers is a carbon fiber, and wherein said adhesive is an electrically conductive adhesive.

8. A method according to claim 7 further comprising the step of depositing an electrochemical catalyst material on said portion of said plurality of fibers that are coupled to said adhesive.

9. A method according to claim 8 wherein said electrochemical catalyst material is an alloy of palladium and iridium.

10. A method according to claim 1 wherein said step of generating an electric field comprises the steps of:
applying a voltage to one of said first electrically conductive surface and said second electrically conductive surface; and
electrically coupling the other of said first electrically conductive surface and said second electrically conductive surface to ground potential.

11. A method of fabricating a fibrous structure, comprising the steps of:
depositing a plurality of fibers directly on a first electrically conductive surface;
depositing a layer of electrically conductive adhesive on a second electrically conductive surface;
disposing said second electrically conductive surface over said first electrically conductive surface such that said layer of electrically conductive adhesive opposes said plurality of fibers and is spaced apart there from;
creating a vacuum in the space between the first electrically conductive surface and the second electrically conductive surface;
filling said vacuum with sulfur hexafluoride gas that has been filtered to remove hydrogen fluoride by passing the sulfur hexafluoride gas through a drying tube containing calcium sulfate and sodium hydroxide, wherein the sulfur hexafluoride is first passed over the calcium sulfate, which removes water and some hydrogen fluoride, after which the sulfur hexafluoride is then passed over sodium hydroxide;
generating an electric field between said first electrically conductive surface and said second electrically conductive surface, wherein at least a portion of said plurality of fibers leave said first electrically conductive surface and are coupled on one end thereof to said layer of electrically conductive adhesive; and
curing said layer of electrically conductive adhesive, wherein said portion of said plurality of fibers are coupled to said second electrically conductive surface.

12. A method according to claim 11 wherein each of said plurality of fibers is electrically conductive.

13. A method according to claim 11 wherein the step of depositing a layer of electrically conductive adhesive comprises screen printing methods.

14. A method according to claim 13 wherein the step of depositing a layer of electrically conductive adhesive further comprises including a support substrate when a wet adhesive is being used.

15. A method according to claim 11 wherein, following said step of curing, said method further comprises the step of depositing an electrically conductive material on said portion of said plurality of fibers coupled to said second electrically conductive surface.

16. A method according to claim 15 wherein said material is a catalyst material.

17. A method according to claim 11 wherein each of said plurality of fibers is a carbon fiber.

18. A method according to claim 17 wherein, following said step of curing, said method further comprises the step of depositing an electrochemical catalyst material on said portion of said plurality of fibers coupled to said second electrically conductive surface.

19. A method according to claim 18 wherein said electrochemical catalyst material is an alloy of palladium and iridium.

20. A method according to claim 11 wherein said step of generating an electric field comprises the steps of:
applying a voltage to one of said first electrically conductive surface and said second electrically conductive surface; and
electrically coupling the other of said first electrically conductive surface and said second electrically conductive surface to ground potential.

* * * * *